(12) United States Patent
Yamaguchi et al.

(10) Patent No.: US 8,081,343 B2
(45) Date of Patent: Dec. 20, 2011

(54) IMAGE FORMING SYSTEM AND COMPUTER READABLE MEDIUM STORING IMAGE FORMING PROGRAM

(75) Inventors: Yuya Yamaguchi, Saitama (JP); Nobuhide Kawabata, Saitama (JP)

(73) Assignee: Fuji Xerox Co., Ltd., Tokyo (JP)

( * ) Notice: Subject to any disclaimer, the term of this patent is extended or adjusted under 35 U.S.C. 154(b) by 286 days.

(21) Appl. No.: 11/964,115

(22) Filed: Dec. 26, 2007

(65) Prior Publication Data

US 2008/0158576 A1    Jul. 3, 2008

(30) Foreign Application Priority Data

Dec. 28, 2006 (JP) ................................. 2006-354370
May 25, 2007 (JP) ................................. 2007-138804

(51) Int. Cl.
*G06F 15/00* (2006.01)

(52) U.S. Cl. ......... 358/1.9; 358/1.5; 358/3.28; 358/518; 358/523; 358/524; 358/537; 358/538; 358/540; 382/162; 382/167; 345/594; 345/600; 345/604; 345/623

(58) Field of Classification Search .................. None
See application file for complete search history.

(56) References Cited

U.S. PATENT DOCUMENTS

| | | | |
|---|---|---|---|
| 2002/0136428 A1* | 9/2002 | Sugahara et al. | 382/100 |
| 2003/0123073 A1* | 7/2003 | Ohta et al. | 358/1.9 |
| 2003/0131237 A1* | 7/2003 | Ameline et al. | 713/176 |
| 2005/0190405 A1* | 9/2005 | Tomita | 358/1.18 |
| 2006/0147236 A1* | 7/2006 | Uchida et al. | 400/62 |
| 2006/0215876 A1* | 9/2006 | Sugahara et al. | 382/100 |
| 2007/0091352 A1* | 4/2007 | Nakata et al. | 358/1.14 |

FOREIGN PATENT DOCUMENTS

JP    08-274969 A    10/1996

* cited by examiner

*Primary Examiner* — Sudhanshu Pathak
*Assistant Examiner* — Miya J Cato
(74) *Attorney, Agent, or Firm* — Sughrue Mion, PLLC

(57) ABSTRACT

An image forming system includes: a resource information storage unit that previously stores resource information to be combined with input print information; a first setting unit that sets an image characteristic of the resource information stored in the resource information storage unit; a second setting unit that sets an image characteristic of the input print information; and a color conversion unit that, when the image characteristic set by the first setting unit and the image characteristic set by the second setting unit are different, performs color conversion on the resource information based on the image characteristic set by the first setting unit, and performs color conversion on the print information based on the image characteristic set by the second setting unit.

10 Claims, 10 Drawing Sheets

IMAGE FORMING SYSTEM AND COMPUTER READABLE MEDIUM STORING IMAGE FORMING PROGRAM

CROSS-REFERENCE TO RELATED APPLICATIONS

This application is based on and claims priority under 35 USC 119 from Japanese Patent Application No. 2006-354370 filed Dec. 28, 2006 and Japanese Patent Application No. 2007-138804 filed May 25, 2007.

BACKGROUND

1. Technical Field

The present invention relates to an image forming system and a computer readable medium storing an image forming program.

2. Related Art

A printer which performs printing on continuous-form paper or the like generally performs two types of printings: print-outputting print information on a prepared print form on which a previously-set print resource is printed; and combining the print information with image information of the print resource and transmitting the combined information, as print information, to a printer so as to perform printing by the printer.

However, in the former case, the printing is costly by use of the prepared print form. In the latter case, the amount of information transmitted to the printer is too large in accordance with the type of print resource, and in a high-speed printer such as a continuous-sheet printer, the performance may be degraded.

Accordingly, a method of previously registering print information to be used as resource information in a printer, and combining print information with the resource information on the printer side upon printing, is known. According to this method, the problems of cost and reduction of print speed do not occur.

Most of conventional continuous-sheet printers have performed monochrome printing, and color conversion on print resources has not been required much. However, in recent years, due to the appearance of color continuous-sheet printers, print resources to handle color image information such as a photograph and TIFF (Tag Image File Format) image are increasing, and there is a need for color conversion on print resources. In color conversion, the color characteristic is changed in correspondence with print sheet type, and/or environment including temperature and humidity upon printing.

However, in the conventional image forming system, when print information and prepared resource information are combined and print-outputted on the printer side, the color characteristic is set in accordance with one of the print information and the resource information. Accordingly, it is possible to reproduce the color tones of the both print information and resource information under optimum conditions.

For example, in a case where information on a frame is set as resource information, and information on characters in the frame is set as print information, when the color characteristic is set in accordance with the frame information, the printing quality of the characters is degraded. On the other hand, when the color characteristic is set in accordance with the character information, the printing quality of the frame is degraded.

There is disclosed, as a technique for setting for a print resource, a recording apparatus in which color designation for resource information can be changed in printing of a series of image information.

SUMMARY

According to an aspect of the invention, there is provided an image forming system including: a resource information storage unit that previously stores resource information to be combined with input print information; a first setting unit that sets an image characteristic of the resource information stored in the resource information storage unit; a second setting unit that sets an image characteristic of the input print information; and a color conversion unit that, when the image characteristic set by the first setting unit and the image characteristic set by the second setting unit are different, performs color conversion on the resource information based on the image characteristic set by the first setting unit, and performs color conversion on the print information based on the image characteristic set by the second setting unit.

BRIEF DESCRIPTION OF THE DRAWINGS

Exemplary embodiment of the present invention will be described in detail based on the following figures, wherein.

DETAILED DESCRIPTION

Next, exemplary embodiments of the present invention will be described in detail based on the drawings.

First Exemplary Embodiment

Figure 1:
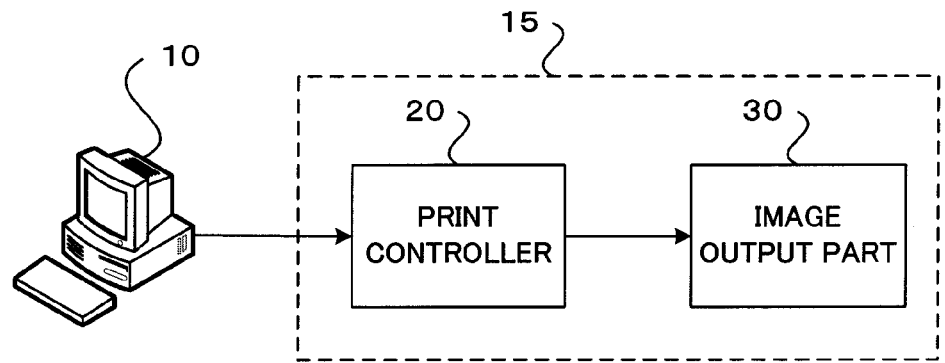
FIG. 1 is a block diagram showing the configuration of an image forming system according to a first exemplary embodiment of the present invention.

FIG. 1 is a block diagram showing the configuration of an image forming system according to a first exemplary embodiment of the present invention.

As shown in FIG. 1, the image forming system according to the first exemplary embodiment has a terminal device 10 and a printer 15. Further, the printer 15 has a print controller 20 and an image output part 30.

The terminal device 10 generates print data such as a print job and transmits the print data to the printer 15. The print controller 20 of the printer 15 causes the printer 15 to receive the print data transmitted from the terminal device 10 and output an image corresponding to the print data to the image output part 30. The image output part 30 is a color continuous-sheet printer capable of color printing on continuous-form paper.

Figure 2:
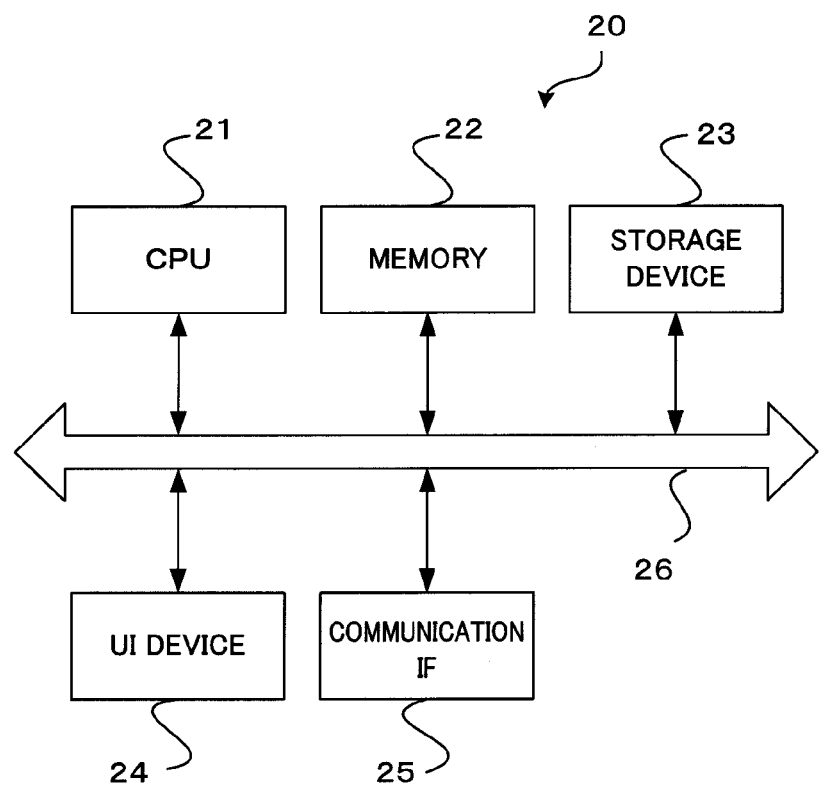
FIG. 2 is a block diagram showing the hardware configuration of a print controller 20 in the image forming system according to the first exemplary embodiment of the present invention.

FIG. 2 shows the hardware configuration of the print controller 20 according to the present exemplary embodiment.

As shown in FIG. 2, the print controller 20 has a CPU 21, a memory 22, a storage device 23 such as a hard disk drive (HDD), a user interface (UI) device 24 including a touch panel or a liquid crystal display and a keyboard, and a communication interface (IF) 25 to perform data transmission/reception to/from the terminal device 10 and the image output part 30. These constituent elements are interconnected via a control bus 26.

The CPU 21 performs predetermined processing based on a control processing program stored in the memory 22 or the storage device 23, thereby controls the operation of the print controller 20.

Note that the control program executed by the CPU 21 may be, e.g., although not shown, a portable storage medium such as a CD-ROM, a DVD, a magneto-optical disk or an IC card, or a storage device such as an external HDD connected via a network. Accordingly, it is possible to provide the program according to the exemplary embodiments of the present invention to be described later or the like using a communication medium, and store the program in a storage medium such as a CD-ROM and provide the storage medium.

Figure 3:
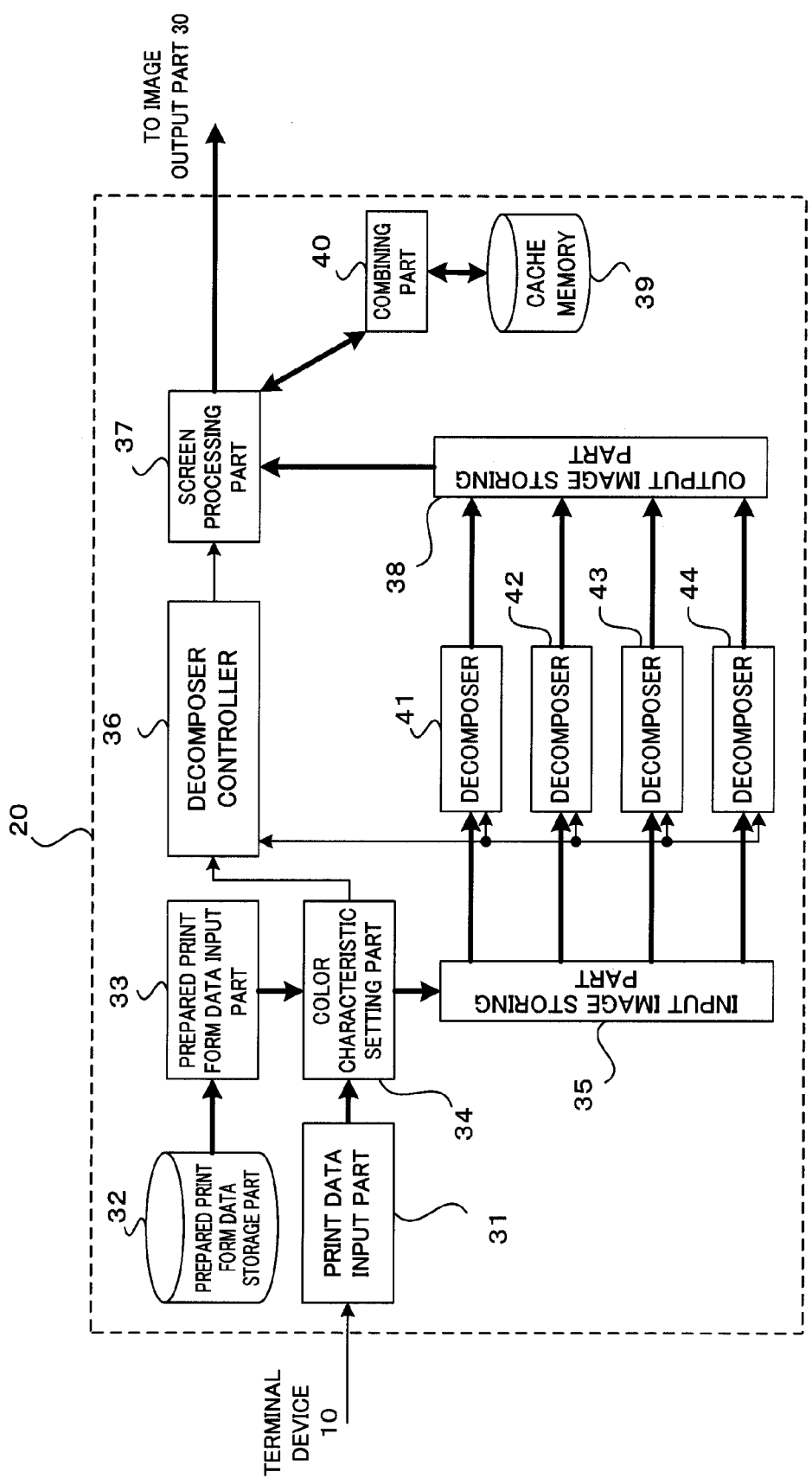
FIG. 3 is a block diagram showing the functional configuration of the print controller 20 in the image forming system according to the first exemplary embodiment of the present invention.

FIG. 3 is a block diagram showing the functional configuration of the print controller 20 realized by execution of the above-described control processing program.

As shown in FIG. 3, the print controller 20 has a print data input part 31, a prepared print form data storage part 32, a prepared print form data input part 33, a color characteristic setting part 34, an input image storing part 35, a decomposer controller 36, a screen processing part 37, an output image storing part 38, a cache memory 39, a combining part 40, and decomposers 41 to 44. Note that in FIG. 3, a bold arrow indicates the flow of image data, and a thin arrow, the flow of control instruction.

The print data input part 31 receives print data (print information) transmitted from the terminal device 10. Prepared print form data (resource information) to be combined with input print data and print-outputted on continuous-form paper is previously stored in the prepared print form data storage part 32.

The prepared print form data input part 33 reads the prepared print form data stored in the prepared print form data storage part 32 and outputs the prepared print form data to the color characteristic setting part 34.

The color characteristic setting part 34 has a setting unit to set a color characteristic of prepared print form data stored in the prepared print form data storage part 32, and a setting unit to set a color characteristic of print data inputted by the print data input part 31.

The input image storing part 35 inputs print data and prepared print form data, for which color characteristics have been set by the color characteristic setting part 34, and stores the data.

The decomposers 41 to 44 perform RIP (Raster Image Processing) to map print data and prepared print form data stored in the input image storing part 35 into raster images. More particularly, when the color characteristic set by the color characteristic setting part 34 for the print data and the color characteristic set by the color characteristic setting part 34 for the prepared print form data are different, the decomposers 41 to 44 function as color conversion units to independently perform color conversion processing on the print data and the prepared print form data, based on the respective color characteristics.

Note that when the color characteristic has not been set by the color characteristic setting part 34 for the prepared print form data, the decomposers 41 to 44 perform color conversion on the prepared print form data based on the color characteristic set for the print data.

Note that the color conversion processing includes input/output color conversion processing, calibration processing, user TRC (Tone Reproduction Curve) processing, and toner total amount regulation processing.

The input/output color conversion processing is conversion of RGB image data into CMYK image data using a 4DULT (Direct Look Up Table) or the like. The calibration processing is correction of the gray-scale of input image signal such that an output result from the image output part 30 corresponds with a target density. Further, the user TRC processing is correction of gray-scale characteristic in correspondence with print sheet type or the like. Further, the toner total amount regulation processing is limiting respective color toner amounts such that the total amount of the CMYK color toner becomes equal to or less than a set upper limit value.

Further, the present exemplary embodiment employs a multi decomposer structure in which the four decomposers 41 to 44 respectively having a CPU perform processing in parallel. Accordingly, the color conversion processing on input print data and the color conversion processing on prepared print form data can be performed in parallel. The four decomposers 41 to 44 function as independently-operative color conversion processing execution units.

The decomposer controller 36 performs the color conversion processing on print data and prepared print form data stored in the input image storing part 35 by controlling the decomposers 41 to 44. The output image storing part 38 stores the print data and the prepared print form data subjected to the color conversion by the decomposers 41 to 44.

Figure 4:
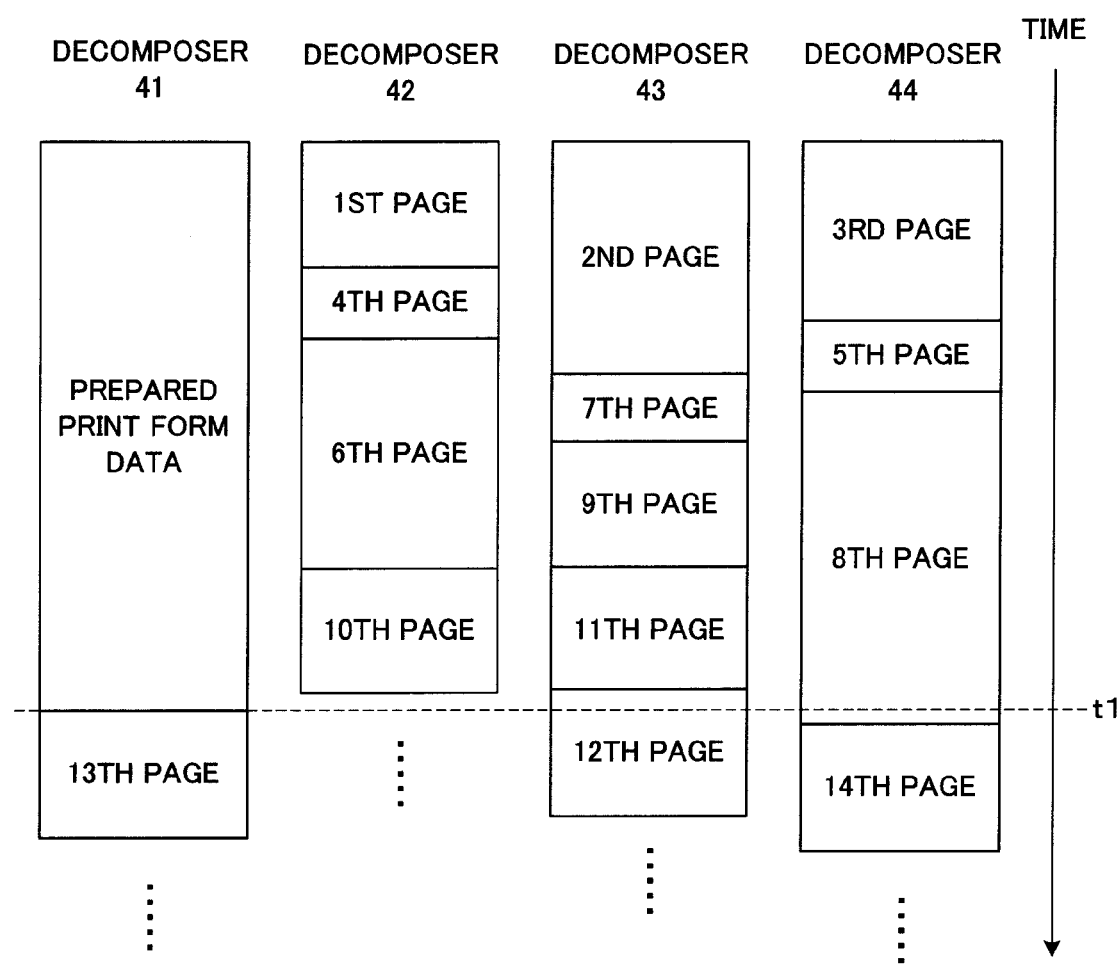
FIG. 4 is a particular example of parallel processing in decomposers 41 to 44.

FIG. 4 shows a particular example of parallel processing in the decomposers 41 to 44. In the example shown in FIG. 4, the decomposer 41 performs the RIP processing on prepared print form data, and the other three decomposers 42 to 44 perform the RIP processing on print data.

When the RIP processing on the prepared print form data has been completed, page-unit output print processing can be performed without a problem. However, when the RIP processing on the prepared print form data has not been completed, the page-unit output print processing is performed, with the prepared print form data, after the completion of the RIP processing. That is, in FIG. 4, as the RIP processing on the prepared print form data has not been completed until time t1, the output processing of the print data subjected to the RIP processing by the decomposers 42 to 44 is not performed until the time t1 has elapsed.

Note that when the decomposer 41 has completed the RIP processing on the prepared print form data, the decomposer 41 performs RIP processing on the remaining print data.

The cache memory 39 is a memory for temporary storage of prepared print form data subjected to the color conversion by any one of the decomposers 41 to 44. As the prepared print form data is required by page, the prepared print form data subjected to the RIP processing is stored in the cache memory 39, and can be utilized when required.

Note that upon storage of color-converted prepared print form data into the cache memory 39, past data may be deleted by overwriting on the past data. Otherwise, when once-stored prepared print form data may be deleted when the data becomes unnecessary. In the latter case, erroneous mixing of undeleted data in new prepared print form data can be prevented.

The screen processing part 37 converts CMYK color multivalued image data stored in the output image storing part 38 into CMYK binary image data by binarization processing, and outputs the binary image data to the image output part 30.

After screen processing by the screen processing part 37, the combining part 40 combines print data with prepared print form data stored in the cache memory 39.

The image output part 30 outputs an image formed based on the print data combined with the prepared print form data by the combining part 40.

Next, the operation of the image forming system according to the present exemplary embodiment will be described in detail.

Figure 5:
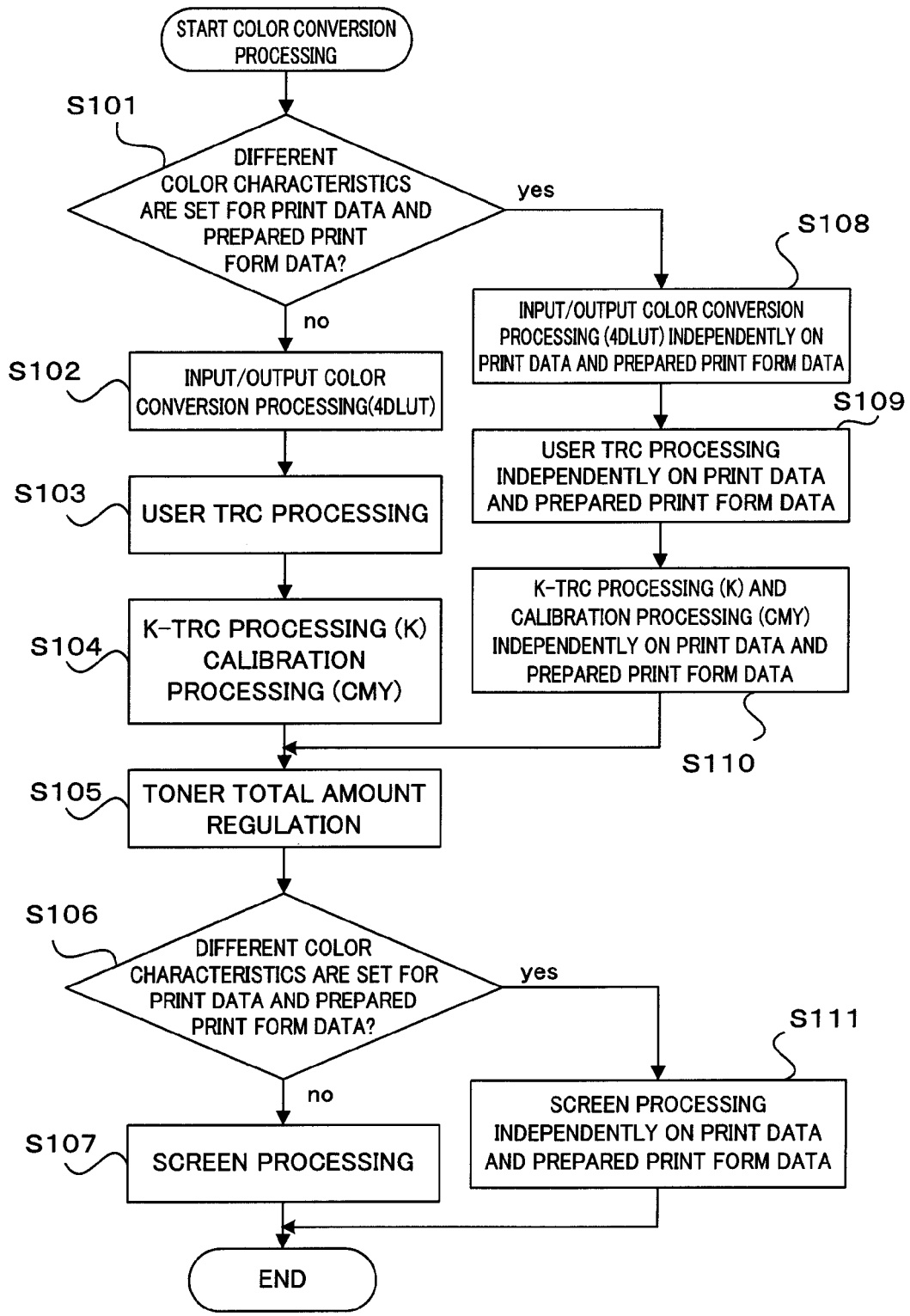
FIG. 5 is a flowchart showing the operation of color conversion processing performed by the decomposers 41 to 44.

FIG. 5 is a flowchart showing the operation of color conversion processing performed by the decomposers 41 to 44.

First, the decomposer 36 determines whether or not different color characteristics are set for print data and prepared print form data (step S101). When it is determined that the same color characteristic is set for the print data and the prepared print form data, the decomposers 41 to 44 perform the input/output color conversion processing (step S102), the user TRC processing (step S103), the K-TRC processing and the calibration processing (step S104) on the print data and the prepared print form data based on the same color characteristic.

Note that upon determination as to whether or not different color characteristics are set, it may be simply arranged such that it is determined whether or not setting for the prepared print form data has been made. Then, when it is determined that setting for the prepared print form data has not been made, the input/output color conversion processing, the user TRC processing, the K-TRC processing and the calibration processing are performed on the prepared print form data based on the same color characteristic as that for the print data.

Thereafter, the decomposers 41 to 44 perform the toner total amount regulation processing (step S105) on the print data and the prepared print form data. Further, in the screen processing part 37, it is determined whether or not different color characteristics are set for the print data and the prepared print form data (step S106). When it is determined that the same color characteristic is set, the same screen processing is performed on the print data and the prepared print form data (step S107).

When it is determined at step S101 that different color characteristics are set for the print data and the prepared print form data, the decomposers 41 to 44 independently perform the input/output color conversion processing (step S108), the user TRC processing (step S109), the K-TRC processing and the calibration processing (step S110) on the print data and the prepared print form data.

Thereafter, the decomposers 41 to 44 perform the toner total amount regulation processing (step S105) on the print data and the prepared print form data. Further, in the screen processing part 37, it is determined whether or not different color characteristics are set for the print data and the prepared print form data (step S106). When it is determined that different color characteristics are set for the print data and the prepared print form data, the screen processing is performed independently on the print data and the prepared print form data (step S111). Note that the print data and the prepared print form data subjected to the screen processing are combined with each other by the combining part 40.

Note that at the above-described steps S104 and S110, the K-TRC processing is performed on K (black) image data and the calibration processing is performed on C (cyan), M (magenta) and Y (yellow) image data.

That is, regarding K color, to correct gray-scale characteristic due to time variation or the like, only the single color gray-scale characteristic may be corrected. However, regarding CMY colors, even when a single color gray-scale characteristic is corrected, color reproducibility of a color obtained by mixing plural colors is poor. Accordingly, correction using a 3D calibration table or the like is required.

Further, in the image forming system according to the present exemplary embodiment, the RIP processing can be simultaneously performed on the print data and the prepared print form data by utilizing multi decomposer processing, and the prepared print form data subjected to the RIP processing is stored in the cache memory 39 so as to be re-used.

Second Exemplary Embodiment

Next, the image forming system according to a second exemplary embodiment of the present invention will be described.

In the image forming system according to the above-described first exemplary embodiment, the toner total amount regulation processing is performed in the color conversion processing by the decomposers 41 to 44. However, in an image forming system in which print data and prepared print form data are combined, even when toner amounts (color material amounts) are respectively limited for the print data and the prepared print form data, the toner amount in the print data combined with the prepared print form data may exceed a limit value. When the toner amount is greater than the regulation amount, the toner cannot be completely fixed to print paper.

Figure 6:
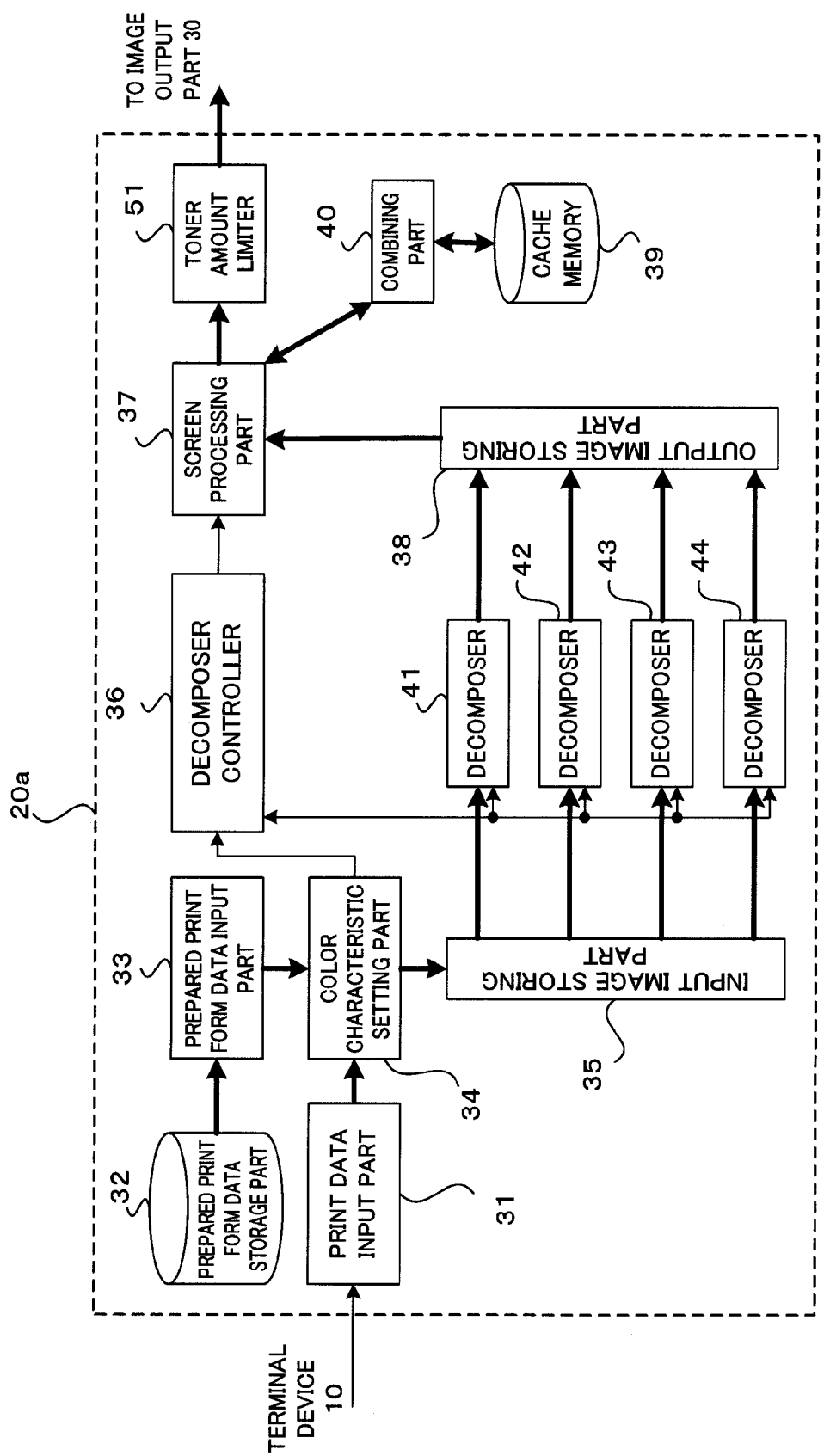
FIG. 6 is a block diagram showing the functional configuration of a print controller 20a in the image forming system according to a second exemplary embodiment of the present invention.

In the image forming system according to the present exemplary embodiment, the print controller 20 in the image forming system of the first exemplary embodiment shown in FIG. 1 is replaced with a print controller 20*a* shown in FIG. 6.

The print controller 20*a* has a configuration in which a toner amount limiter 51 is added to the configuration of the print controller 20 shown in FIG. 3. Note that in FIG. 6, constituent elements corresponding to those in FIG. 3 have the same reference numerals, and the explanations of the elements will be omitted.

When the screen processing part 37 has performed the screen processing and the combining part 40 has combined the prepared print form data with the print data, the toner amount limiter 51 limits a toner amount such that a toner amount within a predetermined range of the print data becomes equal to or less than a predetermined toner amount regulation value X. More particularly, the toner amount limiter 51 performs toner amount limitation by limiting a total sum of signal levels of respective CMYK color components of the print data, combined with the prepared print form data, e.g., a total sum within a pixel range, to or less than the toner amount regulation value X.

Note that since the toner amount limiter 51 performs the toner amount limitation on print data binarized by the screen processing part 37 (binary data), the toner amount limiter 51 temporarily converts the binary print data to multivalued print data, then performs the toner amount limitation.

Note that the toner amount limitation by the toner amount limiter 51 may be realized with any method. For example, only the CMY component signal levels may be limited without limitation of K color signal level. Otherwise, the toner amount limitation may be performed such that the K color signal level is changed. Further, the toner amount limitation may be performed using UCR (Under Color Removal) or GCR (Gray-Component Replacement).

Next, the toner amount limitation processing in the print controller 20a in the image forming system according to the present exemplary embodiment will be described with reference to the flowchart of FIG. 7.

First, the decomposers 41 to 44 perform various color conversion processing such as input/output color conversion (step S201), and prepared print form data and print data subjected to the various color conversion processing are binarized by the screen processing by the screen processing part 37, and combined with each other by the combining part 40 (step S202).

Then the toner amount limiter 51 determines whether or not the print data combined with the prepared print form data has an area in which the toner amount exceeds the regulation value X (step S203). When there is an area in which the toner amount exceeds the regulation value X, the toner amount limiter 51 performs processing to limit the toner amount in the area to or less than the regulation value X (step S204).

Third Exemplary Embodiment

Next, the image forming system according to a third exemplary embodiment of the present invention will be described.

In the image forming system according to the above-described second exemplary embodiment, the toner amount limiter 51 performs the toner amount limitation on print data binarized by the screen processing part 37 (binary data). Since it is necessary to temporarily convert the binarized print data to multivalued print data before the toner amount limitation, the processing is complicated. Accordingly, in the image forming system according to the present exemplary embodiment, the toner amount limitation is performed on unbinarized print data and prepared print form data.

Figure 8:
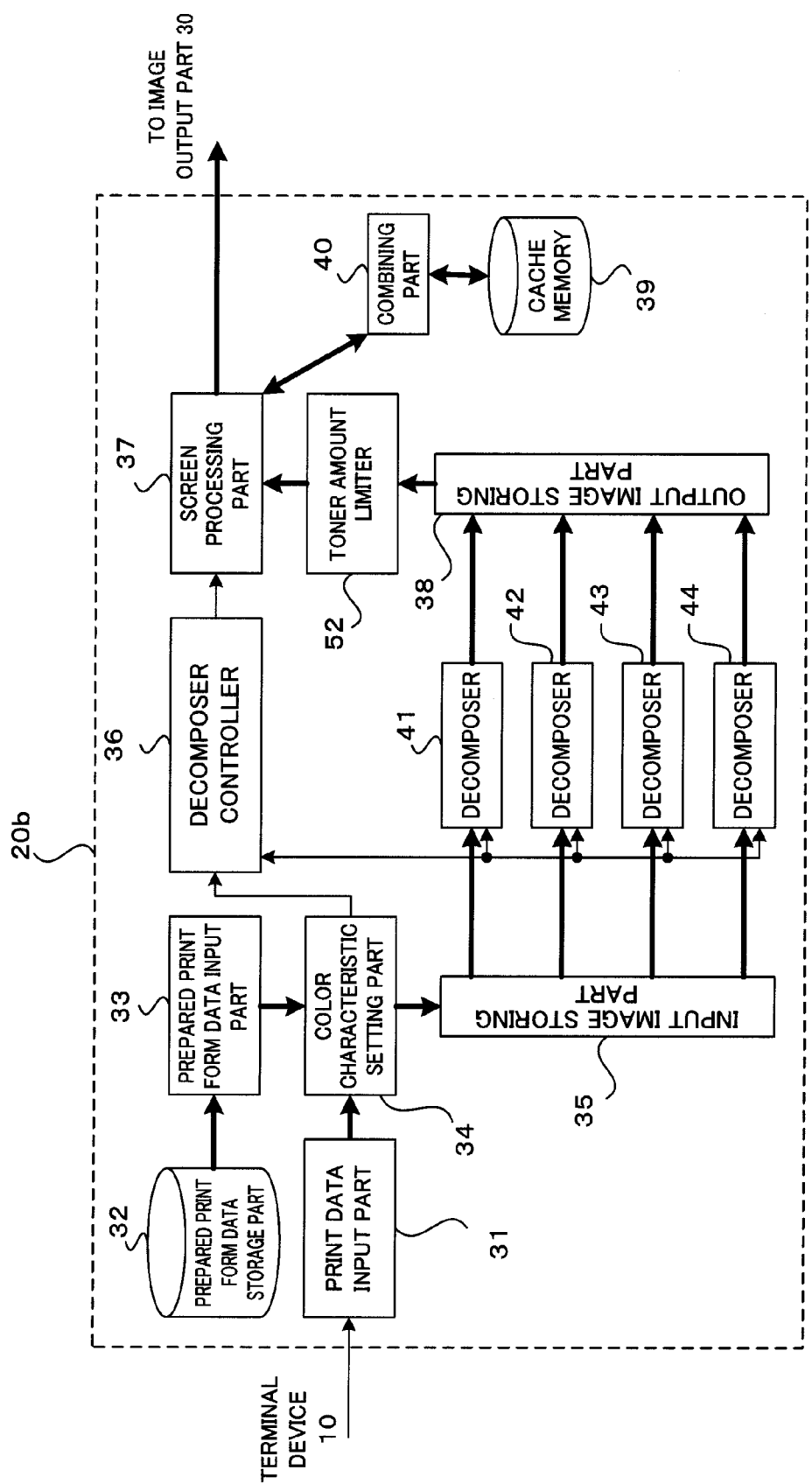
FIG. 8 is a block diagram showing the functional configuration of a print controller 20b in the image forming system according to a third exemplary embodiment of the present invention.

In the image forming system according to the present exemplary embodiment, the print controller 20 in the image forming system of the first exemplary embodiment shown in FIG. 1 is replaced with a print controller 20b shown in FIG. 8.

The print controller 20b has a configuration in which a toner amount limiter 52 is added to the configuration of the print controller 20 shown in FIG. 3. Note that in FIG. 8, constituent elements corresponding to those in FIG. 3 have the same reference numerals, and the explanations of the elements will be omitted.

When the combining part 40 has combined the prepared print form data with the print data, the toner amount limiter 52 determines (predicts) an area in which the prepared print form data and the print data overlap each other. Then the toner amount limiter 52 limits toner amounts for the prepared print form data and the print data, subjected to the various color conversion processing by the decomposers 41 to 44, such that the toner amount within a predetermined range in the area determined that the prepared print form data and the print data overlap each other becomes equal to or less than the predetermined limitation value X.

When the prepared print form data has been combined to the print data, as a method of determination by the toner amount limiter 52 as to whether or not there is an area in which the prepared print form data and the print data overlap each other, determination of the presence/absence of overlap may be made by use of coordinate information of the prepared print form data and the print data.

Next, the toner amount limitation processing in the print controller 20b in the image forming system according to the present exemplary embodiment will be described with reference to the flowchart of FIG. 9.

First, the decomposers 41 to 44 perform various color conversion processing such as input/output color conversion (step S301). Then, when the prepared print form data as resource data and the print data have been combined, the toner amount limiter 52 determines whether or not there is an area in which the prepared print form data and the print data overlap each other (step S302). When it is determined that there is an area in which the prepared print form data and the print data overlap each other, the toner amount limiter 52 determines whether or not the toner amount exceeds the regulation value X in the overlap area (step S303).

When it is determined that the toner amount exceeds the regulation value X in the overlap area, the toner amount limiter 52 performs processing to limit the toner amount for the prepared print form data and the toner amount for the print data such that the toner amount in the area becomes equal to or less than the regulation value X (step S304).

Then, the prepared print form data and the print data, for which the toner amount limitation has been performed by the toner amount limiter 52, are binarized by the screen processing by the screen processing part 37, and combined by the combining part 40 (step S305).

When it is determined at step S302 that there is no area in which the prepared print form data and the print data overlap each other, and when it is determined at step S303 that the toner amount does not exceed the regulation value X in the area in which the prepared print form data and the print data overlap each other, the toner amount limitation processing is not performed, and the screen processing is performed (step S305).

In the image forming system according to the present exemplary embodiment, the toner amount limitation processing can be performed when the prepared print form data and the print data are multivalued data before binarization by the screen processing part 37.

Fourth Exemplary Embodiment

Next, the image forming system according to a fourth exemplary embodiment of the present invention will be described.

In the image forming system according to the above-described second exemplary embodiment, the toner amount limitation is performed on the print data, subjected to the screen processing by the screen processing part 37 and combined with the prepared print form data. Further, in the image forming system according to the above-described third exemplary embodiment, the toner amount limitation is respectively performed on the prepared print form data and the print data before the screen processing by the screen processing part 37. In the image forming system according to the present exemplary embodiment, the toner amount limitation is performed before and after the screen processing by the screen processing part 37.

Figure 10:
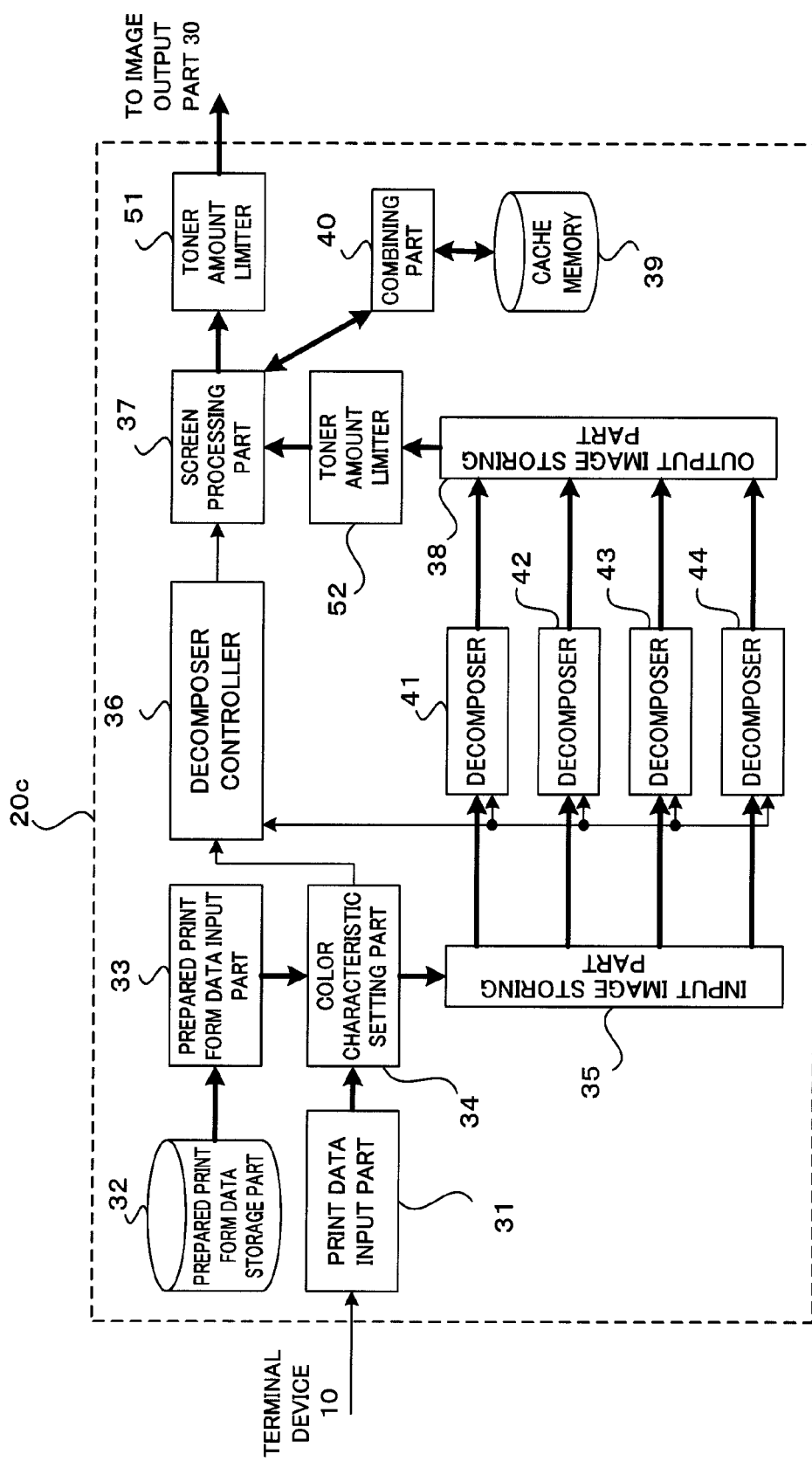
FIG. 10 is a block diagram showing the functional configuration of a print controller 20c in the image forming system according to a fourth exemplary embodiment of the present invention.

In the image forming system according to the present exemplary embodiment, the print controller 20 in the image forming system of the first exemplary embodiment shown in FIG. 1 is replaced with a print controller 20c shown in FIG. 10.

The print controller 20c has a configuration in which the toner amount limiter 52 is added to the configuration of the print controller 20a shown in FIG. 6. Note that in FIG. 10, constituent elements corresponding to those in FIGS. 3, 6 and 8 have the same reference numerals, and the explanations of the elements will be omitted.

Next, the toner amount limitation processing in the print controller 20c in the image forming system according to the present exemplary embodiment will be described with reference to the flowchart of FIG. 11.

First, the decomposers 41 to 44 perform various color conversion processing such as input/output color conversion (step S401). Then, when the prepared print form data as resource data and the print data have been combined, the toner amount limiter 52 determines whether or not there is an area in which the prepared print form data and the print data overlap each other (step S402). When it is determined that there is an area in which the prepared print form data and the print data overlap each other, the toner amount limiter 52 determines whether or not the toner amount exceeds the regulation value X in the overlap area (step S403).

When it is determined that the toner amount exceeds the regulation value X in the overlap area, the toner amount limiter 52 performs processing to respectively limit the toner amount for the prepared print form data and the toner amount for the print data such that the toner amount in the area becomes equal to or less than the regulation value X (step S404).

Then, the prepared print form data and the print data, for which the toner amount limitation has been performed by the toner amount limiter 52, are binarized by the screen processing by the screen processing part 37, and combined by the combining part 40 (step S405).

Next, the toner amount limiter 51 determines whether or not the print data combined with the prepared print form data has an area in which the toner amount exceeds the regulation value X (step S406). When there is an area in which the toner amount exceeds the regulation value X, the toner amount limiter 51 performs processing to limit the toner amount in the area to or less than the regulation value X (step S407).

Figure 7:
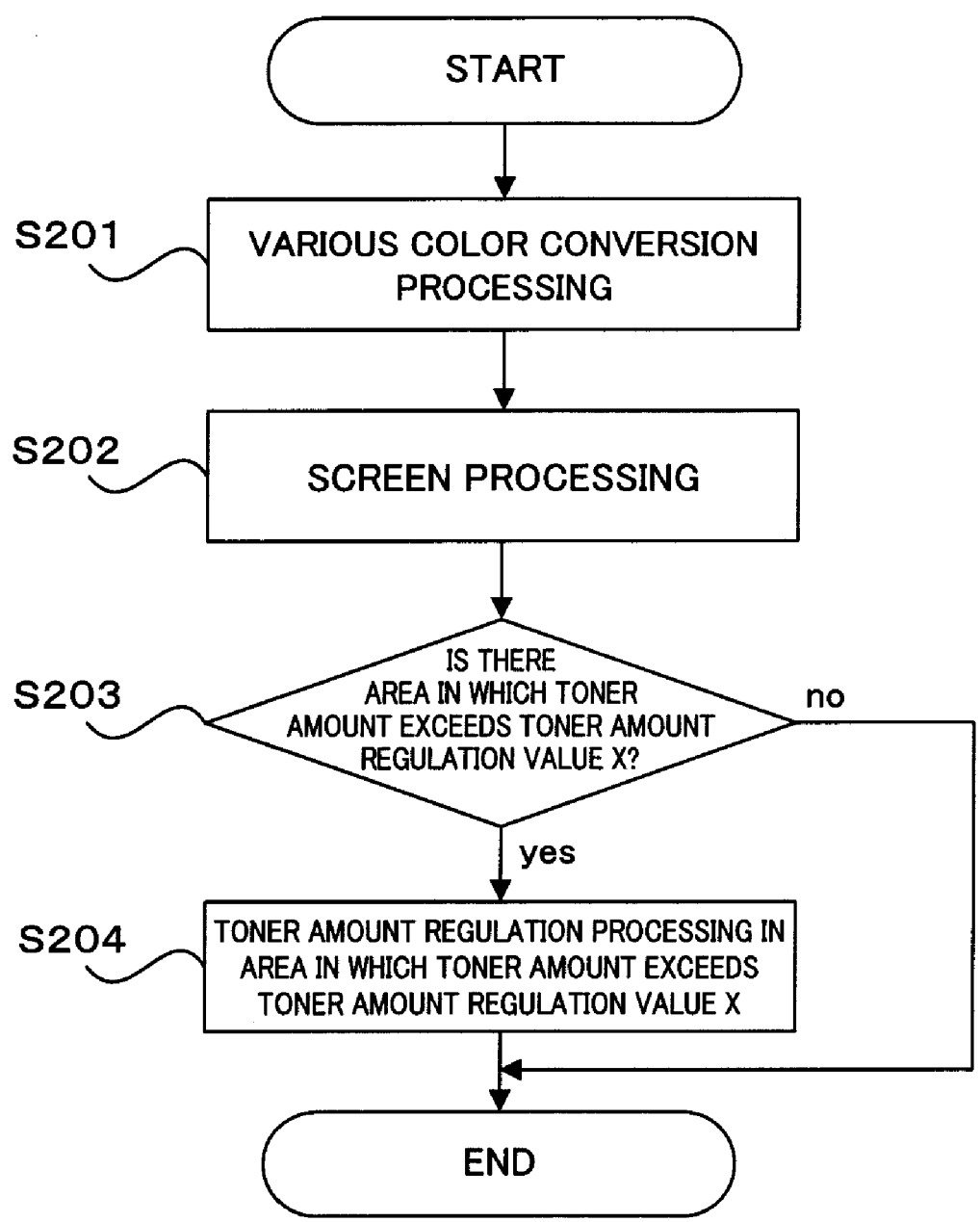
FIG. 7 is a flowchart showing toner amount regulation processing by the print controller 20a in the image forming system according to the second exemplary embodiment of the present invention.
Figure 9:
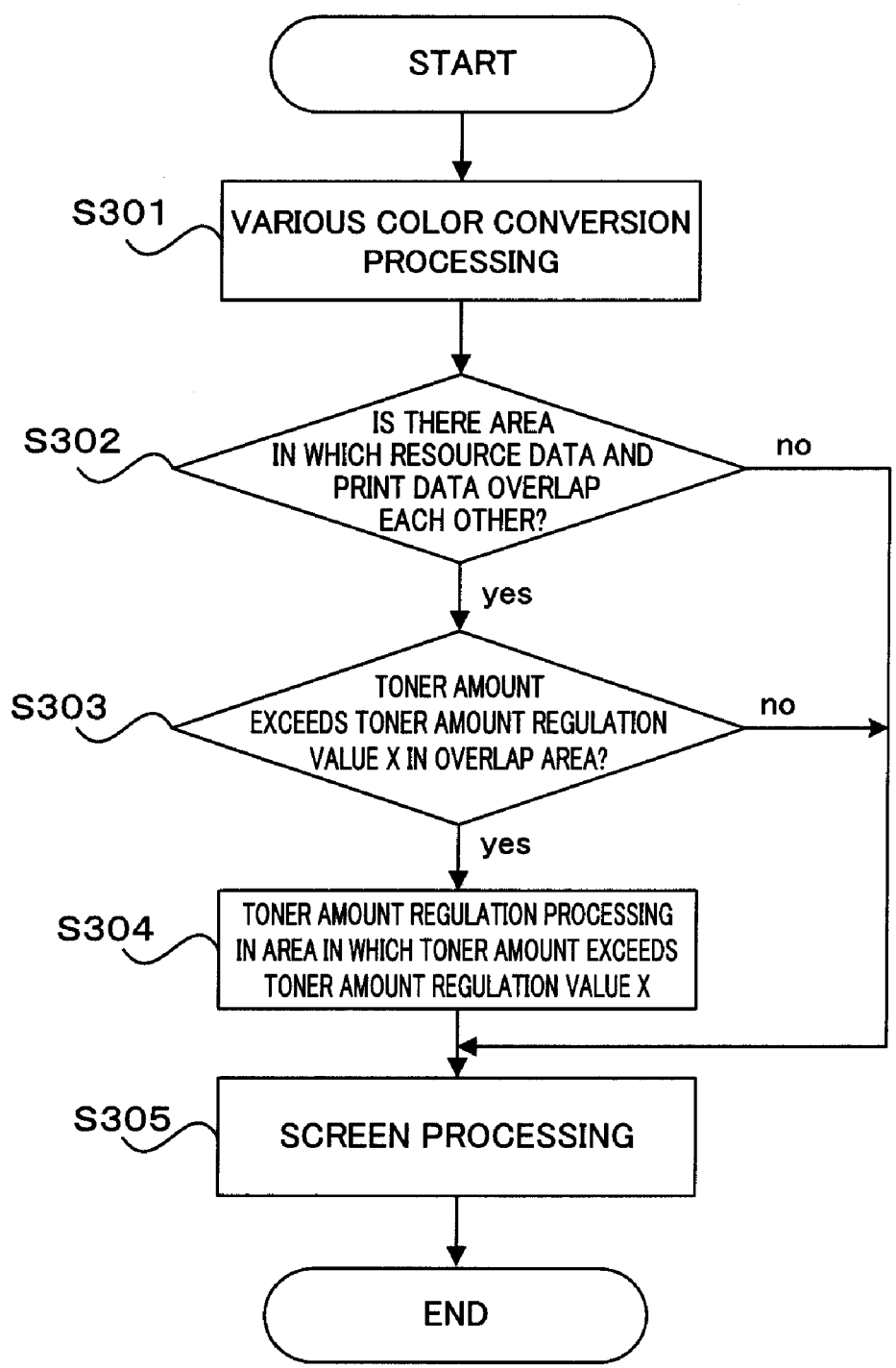
FIG. 9 is a flowchart showing the toner amount regulation processing by the print controller 20b in the image forming system according to the third exemplary embodiment of the present invention.
Figure 11:
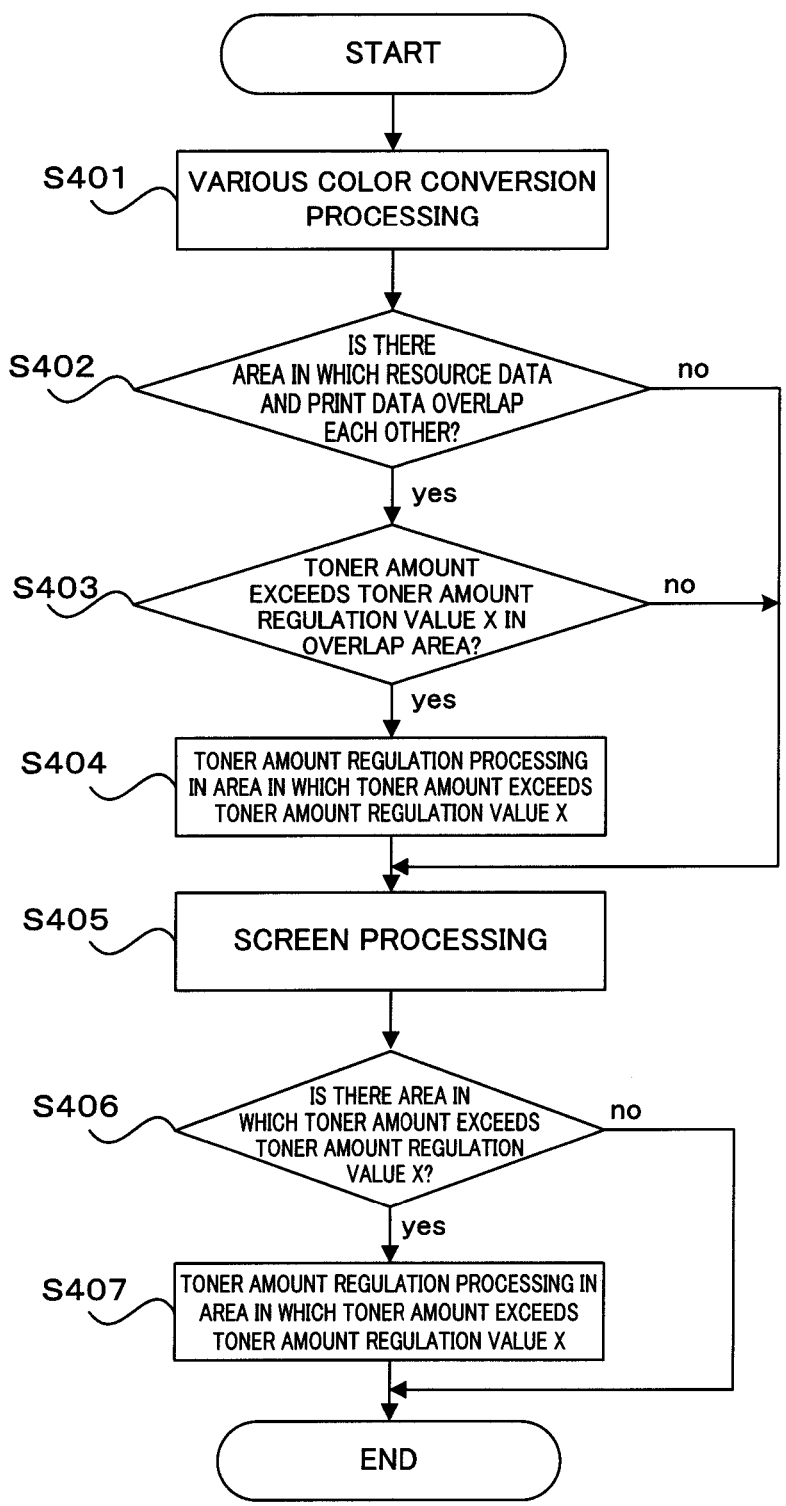
FIG. 11 is a flowchart showing the toner amount regulation processing by the print controller 20c in the image forming system according to the fourth exemplary embodiment of the present invention.

Note that in the flowchart shown in FIG. 11, the processing at steps S401 to S405 corresponds to that at steps S301 to S305 in the flowchart of FIG. 9, and the processing at steps S406 and S407 corresponds to that at steps S203 and S204 in the flowchart of FIG. 7.

[Modification]

In the above exemplary embodiments, the color characteristics are set respectively for the print data and the prepared print form data. However, the present invention is not limited to this arrangement. For example, the present invention is similarly applicable to a case where image characteristics including an output resolution such as the number of screen lines are respectively set for the print data and the prepared print form data.

Further, in the above exemplary embodiments, prepared print form data is used as an example of resource data previously set for printing on continuous-form paper. However, the present invention is not limited to this paper and is applicable to various types of sheets such as a cut sheet.

Further, in the above exemplary embodiments, it is not necessary to independently set all the image characteristics for print data and resource data. For example, the present invention is applicable to a case where at least one or combination of the characteristic of a color conversion table such as a 4DLUT used upon input/output color conversion between different calorimetric systems, a gray-scale correction characteristics such as a user TRC and calibration, the characteristic of output resolution such as the number of screen lines, are independently set for the print data and the resource data.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming system comprising:
a resource information storage unit that stores form data to be combined with input print data;
a first setting unit that determines a first image characteristic of the stored form data;
a second setting unit that determines a second image characteristic of the input print data;
a color conversion unit that determines that the first image characteristic and the second image characteristic are different and, in response to determining that the first image characteristic and the second image characteristic are different, performs color conversion on the form data based on the first image characteristic and performs color conversion on the print data based on the second image characteristic;
a temporary storage unit that stores the color converted form data;
a combining unit that combines the color converted form data with the color converted print data; and
a limitation unit that performs color material amount limitation on a total color material amount of the color converted print data and the color converted form data in an overlap area, in which the color converted form data and the color converted print data overlap each other, to become equal to or less than a predetermined value.

2. The image forming system according to claim 1, wherein the color conversion unit includes a plurality of independently-operative color conversion execution processing units, and performs the color conversion on the input print data and the color conversion on the form data in parallel.

3. The image forming system according to claim 1, further comprising an image output unit that outputs an image formed based on the color converted print data combined with the color converted form data.

4. The image forming system according to claim 1, further comprising:
a determination unit that determines the overlap area.

5. The image forming system according to claim 1, further comprising:
a determination unit that determines the overlap area, and wherein the limitation unit comprises:
a first limitation unit that performs color material amount limitation with respect to the color converted form data and the color converted print data such that a color material amount within a predetermined range in the determined overlap area becomes equal to or less than the predetermined value; and a second limitation unit that performs color material amount limitation such that a color material amount within a predetermined range of the color converted print data combined with the color converted form data becomes equal to or less than a predetermined value.

6. The image forming system according to claim 1, wherein the first image characteristic and the second image characteristic comprise at least one of a color conversion characteristic used upon input/output color conversion between different colorimetric systems, a gray-scale correction characteristic, and an output resolution.

7. The image forming system according to claim 1, wherein the color conversion processing comprises at least one of input/output color conversion processing for converting RGB image data into CMYK image data, calibration processing for correcting a gray-scale of an input image signal, tone reproduction curve (TRC) processing, and toner total amount regulation processing for limiting an amount of toner used to output the resource information and the print information.

8. The image forming system according to claim 1, wherein the color conversion on the form data and the print data is performed in parallel.

9. The image forming system according to claim 1, further comprising an image output part that performs screen processing, wherein the image output part independently performs screen processing on the color converted form data and the color converted print data.

10. A non-transitory computer readable medium storing a program causing a computer to execute a process for image formation, the process comprising:

storing form data to be combined with input print data;

determining a first image characteristic of the stored form data;

determining a second image characteristic of the input print data;

determining that the first image characteristic and the second image characteristic are different;

performing color conversion on the form data based on the first image characteristic and performing color conversion on the print data based on the second image characteristic, in response to determining that the first image characteristic and the second image characteristic are different;

storing the color converted form data;

combining the color converted form data with the color converted print data; and limiting a color material amount of a total color material amount of the color converted print data and the color converted form data in an overlap area, in which the color converted form data and the color converted print data overlap each other, to become equal to or less than a predetermined value.

* * * * *